(No Model.)

O. W. GIBSON.
Motive Power.

No. 242,920. Patented June 14, 1881.

WITNESSES:
Theo. G. Hoster
C. Sedgwick

INVENTOR:
O. W. Gibson
BY Munn & Co.
ATTORNEYS.

UNITED STATES PATENT OFFICE.

OBADIAH W. GIBSON, OF KELLYVILLE, TEXAS.

MOTIVE POWER.

SPECIFICATION forming part of Letters Patent No. 242,920, dated June 14, 1881.

Application filed May 17, 1881. (No model.)

*To all whom it may concern:*

Be it known that I, OBADIAH W. GIBSON, of Kellyville, in the county of Marion and State of Texas, have invented a new and Improved Motive Power, of which the following is a specification.

Figure 1:
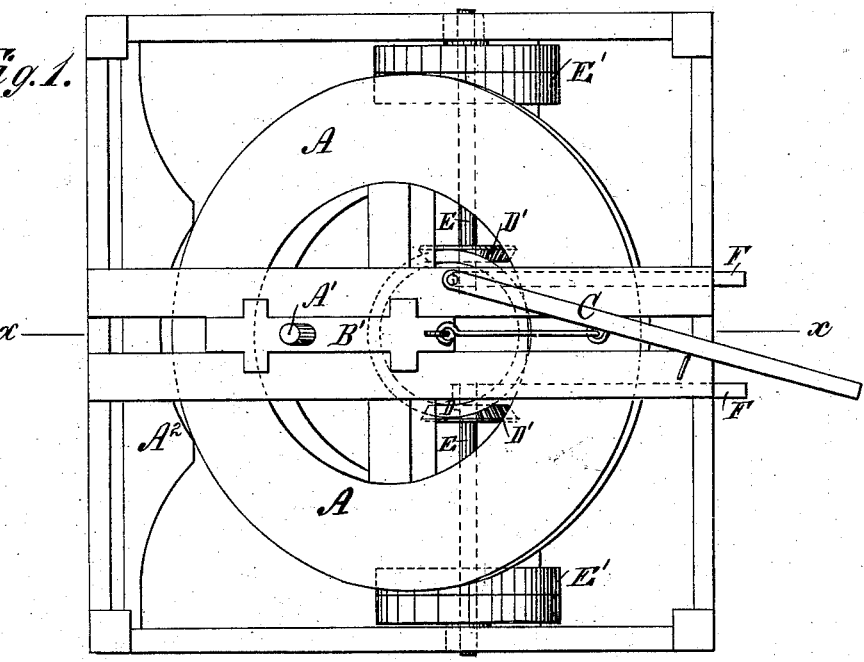
Figure 2:
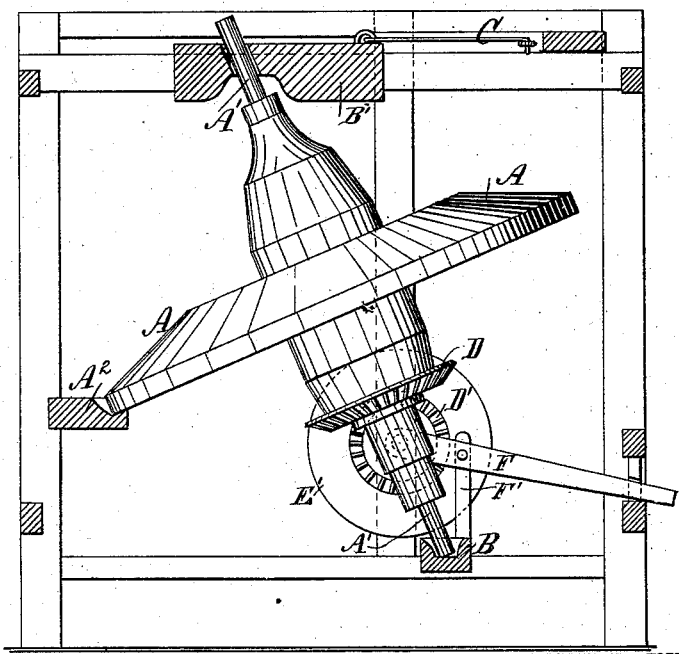

In the accompanying drawings, Figure 1 is a top view, and Fig. 2 a vertical longitudinal section on the line $x$ $x$, Fig. 1, of my improved motive power.

Similar letters of reference indicate corresponding parts.

The invention relates to improvements in motive powers by which the entire power of the horse is thrown on the shaft that operates the gear mechanism, which may be applied to the running of cotton-gins, grist and flouring mills, and other purposes; and the invention consists of an inclined wheel applied to a center shaft that turns in fixed bottom bearings and adjustable top bearings and transmits the power by a crown-wheel and gear-wheels and shafts in one or both directions.

In the drawings, A represents a wheel of suitable diameter and inclination, which is mounted on a shaft, A', that revolves at the lower end in a fixed bearing, B, and at the top in a sliding bearing, B', that is guided in top ways of the supporting-frame, and adjusted by a suitable lever device, C, so as to set the shaft and wheel to a greater or smaller angle of inclination. The horse or other animal mounts the wheel from a suitable support, A², against which the wheel may be rested, if desired. A crown-wheel, D, of the shaft A' gears with bevel or other wheels D' at opposite points, the wheels D' being mounted to the ends of shafts E, that turn in fixed bearings at the outer ends, and adjustable bearings of levers F, which are fulcrumed to suitable supporting-standards F', so as to throw either or both wheels D' out of gear, as desired. The levers F are secured to or released by suitable locking devices, according as the shafts are to be thrown in or out of gear with the driving-shaft. Suitable pulleys E' of the shafts E transmit the power from the main shaft to the mill, machine, or other object to be driven, and admit the running of machines, &c., in either or both directions, as desired, forming strong, substantial, and effective power.

Having thus fully described my invention, I claim as new and desire to secure by Letters Patent—

An improved motive power consisting of an inclined wheel applied to a center shaft revolving in fixed bottom and adjustable top bearings and gearing by a crown-wheel with intermeshing wheels and transmitting shafts that are thrown in and out of gear, to be run in either or both directions, substantially as set forth.

OBADIAH WM. GIBSON.

Witnesses:
S. I. WHITE,
GEO. F. MOSELEY.